United States Patent [19]

Wichelhaus et al.

[11] Patent Number: 4,757,100

[45] Date of Patent: Jul. 12, 1988

[54] CABLE-FILLING COMPOUNDS

[75] Inventors: Juergen Wichelhaus, Wuppertal; Johannes Andres, Duesseldorf; Werner Gruber, Korschenbroich, all of Fed. Rep. of Germany

[73] Assignee: Henkel Kommanditgesellschaft auf Aktien, Duesseldorf, Fed. Rep. of Germany

[21] Appl. No.: 878,920

[22] Filed: Jun. 26, 1986

[30] Foreign Application Priority Data

Jun. 26, 1985 [DE] Fed. Rep. of Germany ....... 3522751

[51] Int. Cl.$^4$ .................. H01B 7/28; H01B 3/18; C09K 3/10; G02B 6/44
[52] U.S. Cl. ................. 523/173; 523/218; 523/219; 524/491; 524/493; 524/570; 524/579
[58] Field of Search ............ 523/173, 218, 219; 524/491, 493, 570, 579

[56] References Cited

U.S. PATENT DOCUMENTS

| | | | |
|---|---|---|---|
| 3,830,953 | 8/1974 | Wood et al. | 523/173 |
| 3,893,839 | 7/1975 | Elliot et al. | 106/272 |
| 3,893,962 | 7/1975 | Walton et al. | 523/173 |
| 3,961,128 | 6/1976 | Beach | 106/272 |
| 4,190,570 | 2/1980 | Kaufman et al. | 523/173 |
| 4,319,071 | 3/1982 | Schmidt | 523/173 |
| 4,351,913 | 9/1982 | Patel | 523/173 |
| 4,361,507 | 11/1982 | Bourland | 523/173 |
| 4,361,508 | 11/1982 | Bourland | 523/173 |
| 4,366,075 | 12/1982 | Beach | 252/28 |

FOREIGN PATENT DOCUMENTS

| | | | |
|---|---|---|---|
| 2320254 | 11/1974 | Fed. Rep. of Germany | 523/173 |
| 3150909 | 7/1983 | Fed. Rep. of Germany . | |
| 3213783 | 10/1983 | Fed. Rep. of Germany . | |
| 0586453 | 3/1977 | Switzerland . | |
| 1399350 | 7/1975 | United Kingdom . | |
| 2092176 | 8/1982 | United Kingdom | 523/173 |
| 2100281 | 12/1982 | United Kingdom . | |

*Primary Examiner*—Herbert J. Lilling
*Attorney, Agent, or Firm*—Ernest G. Szoke; Henry E. Millson, Jr.; Real J. Grandmaison

[57] ABSTRACT

Filling compounds having plastic flow behavior for electrical components and light-wave conductors comprising (a) a non-polar, water-immiscible hydrocarbon organic liquid, (b) an organic polymeric thickening agent therefor, (c) pyrogenic silica, and when used for electrical cables or optionally for optical cables, (d) hollow micro-bodies dispersed in the filling compounds.

15 Claims, No Drawings

CABLE-FILLING COMPOUNDS

BACKGROUND OF THE INVENTION

1. Field of the Invention

This invention relates to filling compounds or sealing compounds for electrical components, such as cables, light-wave conductors, terminal strips or plugs. The filling compounds consist of a polymer solution in which pyrogenic silica is dispersed and which may also contain hollow bodies (e.g., hollow beads). The hollow bodies are optional when the filling compounds are used for light-wave conductors. The filling compounds protect cables and light-wave conductors against the penetration of contaminants, particularly water, and also against mechanical damage during laying or through the effects of temperature.

2. Description of Related Art

It is known that communications cables and also light-wave conductors encounter the danger that any moisture penetrating at a given point spreads out axially and not only reduces the serviceability of the line, but also has a corrosive effect thereon. There has never been any shortage of attempts to overcome this problem by the provision of suitable sealing compounds. For example, German Pat. No. 3150909 describes a filling compound consisting of a viscous water-immiscible substance and elastic hollow bodies finely dispersed therein, the hollow bodies being of such a nature that they can be compressed to a smaller volume by relatively strong forces and thereafter reassume their original volume as the forces diminish.

Although such filling compounds afford a number of advantages by virtue of their relatively low dielectric constant, there is nevertheless a danger at relatively high operating temperatures that the filling compound may escape from the cable through sheath damage or that at least oil leakages may occur. These effects may be counteracted to a certain extent by increasing the proportion of elastic hollow bodies to such an extent that the compounds are only able to flow under pressure, i.e., when the elastic hollow bodies are compressed to a smaller volume. Although it is possible in this way to make cables having slightly better properties, the procedure involved is complicated on account of the high pressures under which the filling conmpound has to be introduced.

To improve the thermal stability under load of the filling compounds according to German Pat. No. 3150909, attempts have been made to stabilize the hollow beads be cross-linking. Thus, it is proposed in German Pat. No. 3213783 to cross-link the beads by electron beam treatment. Although the thermal stability limit of the hollow bodies is thus increased by about 10° C., the filling materials thus treated still show very poor thermal stability under load.

Accordingly, there is a need for filling materials for cables or light-wave conductors which do not escape from damaged parts of a cable even at operating temperatures of about 80° C. or slightly above and which show plastic flow over the entire temperature range of importance in practice, i.e., the filling materials are unable to flow up to a certain shear strain. Nevertheless, the filling materials are intended to show the favorable properties of the known materials containing hollow bodies, particularly in that their dielectric constant is <2.0. Finally, the filling compounds are intended to be processible under the conditions normally applied in cable manufacture.

DESCRIPTION OF THE INVENTION

It is an object of this invention to provide filling materials which show the above described range of properties.

Accordingly, the present invention relates to filling materials for the longitudinal sealing of electrical and-/or optical cables and terminal strips based on a non-polar, water-immiscible hydrocarbon organic liquid component characterized in that the organic liquid contains, in solution at room temperature, an organic thickener based on a polymer (and, optionally a dispersant), and dispersed in this hydrocarbon liquid thickener, pyrogenic silica and, optionally for light-wave conductors and required for electrical conductors, gas-filled micro-hollow bodies from 5 to 500 um in diameter wherein amounts of the substances dispersed in the liquid thickener is from about 10 to about 80% by volume whereby the filling material shows plastic flow behavior.

In a general embodiment, the invention relates to filling materials based on a non-polar, water-immiscible hydrocarbon liquid which is thickened by an organic polymer and shows plastic flow behavior and which contain micro-hollow bodies to give a low dielectric constant for electrical cables. To prevent leakages, a highly dispersed silica is introduced to the hydrocarbon liquid to stabilize the hollow bodies and prevent them from sliding off one another. The filling material may additionally contain a polycondensate having a hydrophobic region and hydrophilic regions, such as terminal amino groups, which act in the manner of a dispersant to disperse and stabilize the micro-hollow bodies and the silica particles in the non-polar medium.

Accordingly, the filling materials according to the invention contain a liquid hydrocarbon as an important component. The quantity of hydrocarbon is generally from about 65 to about 90% by weight and preferably from about 75 to about 88% by weight. In certain cases, particularly where the percentage content of hollow beads or dispersed silica is relatively high, quantities of hydrocarbon liquid of from about 50 to 65% by weight may be sufficient. Suitable non-polar hydrocarbons are primarily mineral oils. Of these, substances having a pour point below 0° C. are preferred. In the case of substances having a higher pour point, it is advisable to use standard pour point depressants. The density of the non-polar hydrocarbons should be between about 0.8 and about 0.95 g/l and preferably between about 0.81 and about 0.91 g/l. An important selection criterion is the kinematic viscosity which should be in the range of from about 2 to about 600 cSt ($mm^2 s^{-1}$) as measured at 20° C. Preference is attributed to non-polar hydrocarbons, particularly mineral oils, having a kinematic viscosity of from about 15 to about 300 cSt, and more especially from about 50 to about 250 cSt.

Another important component of the filling materials according to the invention is the organic thickeners. Suitable organic thickeners are polymers which are soluble in the non-polar hydrocarbons and whose solutions show special rheological properties, i.e., the solutions should show plastic flow behavior either on their own or after addition of the other components of the filling materials, the viscosity of the solutions undergoing little or no reduction with increasing temperature at temperatures of up to about 100° C.

Among the polymers suitable for use as organic thickeners, polyolefins are particularly suitable. Poly-α-olefins and copolymers thereof, including in particular isotatic poly-α-olefins are preferred.

In one preferred embodiment of the invention, from about 2 to about 25% by weight, and more espcially from about 5 to about 20% by weight, of an α-olefin copolymer is used.

α-Olefin copolymers which have been produced by low-pressure polymerization using Ziegler-Natta catalysts are particularly suitable as organic thickeners herein. Thus, suitable copolymers are, for example, copolymers of ethylene and propylene, copolymers of ethylene and α-butylene and copolymers of one of the above-mentioned olefins with α-olefins having a chain length of from $C_5$ to $C_7$. Terpolymers of at least one of the above-mentioned olefins may also be used. It is known to the artisan that the properties of α-olefin copolymers may be varied through the choice of the catalyst and the polymerization temperature and according to the ratio in which the monomers are used. Even with different preconditions, however, the materials obtained are often virtually identical in regard to their end properties. α-Olefin copolymers having a Brookfield melt viscosity of from about 30 to 70 Pas at 190° C. and more especially from about 40 to about 60 Pas are particularly preferred for the purposes of the invention. In this regard, it is desired that their softening point be in the range of from about 90° to about 160° C., and more especially in the range of from about 100° to 125° C., and that their density be from about 0.83 to about 0.9 g/cc.

A particularly preferred class of α-olefin copolymers are copolymers of propylene and α-butylene having a $C_3$ component of from about 55 to about 90% be weight, and more especially from about 60 to about 85% by weight. These copolymers may additionally contain from about 2 to about 10% by weight, and more especially from about 2 to about 5% by weight, of ethylene groups. Among the last-mentioned α-olefin copolymers, coisotactic products are preferred.

The filling materials according to the invention contain as a further constituent from about 2 to about 10% by weight, and preferably from about 3 to about 7% by weight, of highly dispersed silica. Highly dispersed silicas having a particle size of from about 0.007 to about 0.5 micron, and a powder density of from about 20 to about 120 g/l are suitable. However, it is preferred to use silica having a powder density of from about 35 to about 40 g/l and a particle size of from about 0.007 to about 0.014 micron.

Although optional, but preferred, for light conducting cables, when used with electrical cables the filling materials according to the invention will contain as a further constituent from about 0.2 to about 10% by weight, and preferably from about 0.5 to about 5% by weight, of micro-hollow bodies. Among the possible micro-hollow bodies, hollow microbeads are preferred. It is possible to use hollow microbeads on the one hand of inorganic materials, such as for example hollow glass beads, more especially of silicate glasses, and on the other hand even organic hollow microbeads having elastic walls. The hollow beads should have a diameter of from about 10 to about 150 um, and more especially of from about 40 to about 60 um. It is particularly preferred to use lightweight materials having a powder density of less than about 100 kg/m$^3$, and more especially below 50 kg/m$^3$. In addition to the inorganic hollow microbeads mentioned, organic hollow microbeads are particularly preferred. Thus, hollow microbeads based on a copolymer of acrylonitrile and vinylidene chloride may be successfully used. For example, products ranging from 40 to 60 um in diameter are commercially available and suitable. It is also possible to use, for example, hollow polymer microbeads based on acrylonitrile-vinylidene chloride, which are filled with an inert gas, such as isobutane. If desired, it is also possible to use hollow beads of which the walls have been crosslinked through the use of polyfunctional monomers or which have been subsequently crosslinked by ionizing radiation. In any event, the quantity in which the hollow beads are used has to be gauged in such a way that the beads in the final filling material occupy less space under normal pressure than close packed spheres. Accordingly, the quantity of beads in the final filling material should be less than about 90% by volume, preferably less than 70% by volume, and more especially less than 50% by volume because otherwise the cable sheaths could only be filled with the filling material after compression of the particles by high pressure.

The filling materials according to the invention may also contain dispersants. Suitable dispersants include polymers, particularly polycondensates, particularly polycondensates based on hydrophobic and hydrophilic components. Thus, it is possible to use polycondensates synthesized at least partly from dimer fatty acids or the corresponding diamines. Suitable condensates are polyamides of dimer fatty acids and diamines or polyesters of dimer fatty acids and polyfunctional alcohols (functionality 2 or 3, e.g., oligomers). Mixed types may also be used. Polycondensates containing terminal amino groups are preferred. Thus, suitable polycondensates are, for example, polycondensates of a long-chain dicarboxylic acid with one or more diamines or triamines, more especially condensates of dimer fatty acids, trimer fatty acids, monomeric fatty acids and primary or secondary diamines containing from 2 to 36 carbon atoms (dimer fatty amine). Polycondensates of dicarboxylic acids with cyclic amines, such as piperazine, may also be used. The dimer fatty acids may also be replaced to a minor extent by short-chain dicarboxylic acids, for example, sebacic acid or adipic acid. In any event, it is preferred for the polycondensates to contain terminal amino groups. Suitable amine numbers are in the range of from 80 to 400, and more preferably, in the range of from 190 to 230. For example, a preferred material has these characteristics and, in addition, a viscosity of from 0.3 to 4 Pas at 75° C., while other suitable products have a viscosity of from 0.7 to 1.2 Pas at 150° C. If desired, the oligomeric dispersants may be completely or partly replaced by fatty acid esters and/or fatty alcohol ethers.

The filling materials according to the invention may contain as further constituents any of the various auxiliaries normally used in preparations of the type in question. For example, they may contain antioxidants, dyes or even corrosion inhibitors.

The filling materials according to the invention may be used for protecting electrical components of various kinds, such as, for example, cables, plugs, terminal strips, communications cables or even light-wave conductors, against the penetration of contaminants and, in particular, moisture. The filling materials are also suitable, particularly where they contain organic hollow bodies, for protecting light-wave conductors of glass against mechanical damage such as can occur during laying through bending and the effects of temperature. In addition, the filling materials according to the invention may also be used as repair sealing compounds, for example, where electrical lines or components have been deinsulated or damaged in the course of laying work.

The filling materials show many outstanding technical properties. For example, their insulation resistance is high, and their specific volume resistance factor is large. In addition, by virtue of the hollow beads, their dielectric constant is low, i.e., values below 2.3 and in particular even below 2, may be adjusted according to the quantity of hollow beads used. The specific gravity of the preferred filling compounds is below about 1. They are compatible with the various plastics used in electrical components and cables. Thus, the constituents of the filling compounds do not penetrate into such plastics, nor do they affect the usual cable sheath materials. The filling compounds are completely stable at temperatures of up to 90° C. and do not become thin-flowing; even in the event of damage at those temperatures, no leaking occurs. In addition, the filling compounds are flexible and remain flexible at temperatures down to −40° C. without any drastic change in their flow properties and without developing any cracks under stress at low temperatures. In addition, the filling materials according to the invention are readily processible, i.e., even at temperatures below 70° C., they may be introduced under moderate pressure into the cable sheaths to be filled, reaching even difficult places.

EXAMPLES

The following components were used in the Examples:
(A) a mineral oil liquid at room temperature having the following analytical data:
  density at 15° C. according to ASTM D941: 0.886,
  viscosity at 20° C. in cSt according to ASTM D445: 242;
(B) propylene-α-butylene copolymer containing from 2 to 5% ethylene units as additional comonomer to reduce crystallinity, characterized by
  Brookfield melt viscosity at 190° C.: 50,000 mPa.s,
  softening point (R+B) according to DIN 52011: 107°–110° C.,
  density at 23° C. according to DIN 53 479: 0.87,
  break elongation according to DIN 53455, test bar 4: approximately 1250;
(C) highly dispersed silica
  particle size in microns: 0.007,
  powder density: approximately 40 g/l;
(D) hollow microbeads of acrylonitrile-vinylidene chloride copolymer
  particle size: 40–60 um, filled with isobutane (trade name Expancel DE, a product of Kema Nobel Nord);
(E) oligoamide
  prepared by condensation of dimer fatty acid with ethylene diamine; characteristics:
  amine number: 190–230,
  Brookfield viscosity: 35 poises at 75° C.

In the following examples, all quantities are expressed in parts by weight.

Although not recited in the examples, the examples all contain up to 25% by weight antioxidants, i.e. mixtures of Irganox ® 1035, 1010, and 1024 and triphenylphosphine. The quantities in parts by weight are based on 100 without taking the anti-oxidant consitituents into account.

The filling compounds may be prepared using any effective, but non-damaging mixing units which provide for effective mixing even at low speeds, for example turbulence mixers and the like.

The introduction of the compounds into a normal telephone cable was evaluated using a conventional barrel melting unit. The compounds of Examples 1 and 2 were transported at 60° C. All other Examples illustrating the invention could be transported without difficulty at room temperature without any separation or air pockets being observed during transport. By contrast, the compounds of the Comparison Examples separated under the same transport conditions.

The products were tested for several hours under a nitrogen excess pressure of 12 bar. No destruction of the materials occurred. The contraction in volume was less than 1% for the compounds containing hollow microbeads.

EXAMPLES 1

15 parts of the α-olefin copolymer (component B) were dissolved while stirring at 130° C. in 80 parts of mineral oil (component A). The mixture was cooled to 70° C. 5 parts of the highly disperse silica (component C) were then added in small portions and incorporated by mixing in such a way that a homogeneous mixture was obtained. The mixture was deaerated under a vacuum of 1.5 kPa.

EXAMPLE 2

A mixture was prepared as described in Example 1, except that 1.5 parts of the oligoamide (component E) were additionally introduced.

EXAMPLE 3

A mixture of 85.8 parts mineral oil (component A), 9.0 parts α-olefin copolymer (component B), and 5 parts highly dispersed silica (component C) was prepared as described in Example 1. 0.2 part hollow microbeads (component D) were incorporated in this mixture at a temperature of from 50° C. to 70° C. After deaeration and cooling to room temperature, the material was stored for 24 hours at room temperature before testing so that the hollow microbeads could be completely "encapsulated" in the silica network.

EXAMPLE 4

A mixture was prepared as described in Example 3, except that 1.5 parts of the oligoamide (component E) were additionally introduced.

EXAMPLE 5

A filling compound having the following composition was prepared as described in Example 3 with 85 parts of component A, 10 parts of component B, 3 parts component C, and 2 parts of component D.

EXAMPLE 6

A filling composition was prepared as in Example 5, but also containing 0.5 part of component E.

All the filling compounds according to the invention satisfy the following requirements:
  flash point in °C. according to DIN 51584: >200° C.,
  dielectric constant at 20° C. according to DIN 53483: <2.3, and volume resistivity at 100° C. in cm according to DIN 53482: $>10^{10}$.
Individual dielectric constants:

| EXAMPLE | DC |
|---------|-----|
| 1 | 2.1 |
| 2 | 2.3 |
| 3 | 1.9 |
| 4 | 2.0 |
| 5 | 1.7 |
| 6 | 1.7 |

The favorable flow properties of the compounds may be demonstrated by a flow curve and a viscosity curve. All the products have a pronounced flow limit at 80° C. and are therefore stable under load.

Example 1 shows rare flow behavior. Like the other Examples, the compound has structural viscosity and is plastic, but shows dilatance-like flow behavior, i.e., viscosity increases, albeit only slightly, with increasing shear load. Accordingly, the compound does not leak, even at relatively high temperatures and under the effect of forces.

COMPARISON EXAMPLES

EXAMPLE 7

A filling compound was prepared as described in Example 1 from 77 parts atactic polypropylene, 20 parts mineral oil (component A) and 3 parts highly dispersed silica (component C). The product had the following characteristics:
density: 0.86 g/cm³,
melt viscosity at 190° C., rotational viscosimeter: 6500 mPa.s.

EXAMPLE 8

A compound was prepared from 7 parts hollow microbeads (component D) and 94 parts mineral oil (component A). The compound thus prepared is extremely pasty.

In order to demonstrate the favorable properties, particularly in regard to low-temperature flexibility, stability under load, and stability on mixing, the compounds of Examples 1 to 6 according to the invention were compared with the comparison compounds of Examples 7 and 8.

The following test methods were used:

Method I—Leakage test (accelerated dropping point determination)

The sealing-filling compounds are introduced into 8 mm diameter, 1 cm long glass tubes open at both ends. The tubes are then placed on polyamide netting having a diameter of 0 2 mm and introduced into a precision-controlled heating cabinet. Beginning at +40° C., the temperature is increased by 10° C. every two hours. The temperature quoted is the temperature at which there is still no leakage of the compound (no dripping).

Method II—Drainage and leakage behavior (phase separation) of filling compounds on vertical glass surfaces A hemispherical, 2 ml large blob is applied to a 20×20 cm glass plate which has been cleaned with acetone. The glass plate is positioned vertically in a recirculating air cabinet in such a way that the compounds to be tested are situated at the upper end of the test plate. The drainage and leakage behavior is assessed after a residence time of 16 hours at 90° C. Leakage is understood to mean that, for example, thinly liquid constituents egress from the compounds and appear as a nose beneath the blob.

Method III—Low-temperature behavior of sealing-/filling compounds

The compound to be tested is injected bubble-free by means of a syringe into a 4 mm diameter, 100 mm long silicone hose. The ends are closed by means of hose clips and the test specimens stored for 24 hours at −40° C. After storage, the test specimen is bent at an acute angle and straightened out again. The filling compound should neither break nor crack.

Method IV—Alternating temperature test

The procedure is as described for method III. The silicone hoses filled with the compound to be tested are alternately stored for 16 hours at −40° C., then bent and then straightened out again. They are then stored for 16 hours at room temperature, bent and then straightened out again, followed by storage at −40° C., bending and straightening and so on for a total of 10 cycles. The compound is inspected for cracks; the number of cycles after which cracks appear is also determined.

The results of these tests on the Examples according to the invention are compared in Table 1 with the results on the Comparison Examples.

TABLE 1

|  | Leakage test method I | Drainage and leakage behavior - method II | Low-temperature behavior - method III | Alternative temperature test - method IV |
|---|---|---|---|---|
| Examples |  |  |  |  |
| 1 | >200° C. | No running/no oil leakage | No cracks | No cracks |
| 2 | >200° C. | No running/no oil leakage | No cracks | No cracks |
| 3 | 90° C. | No running/slight oil leakage | No cracks | No cracks |
| 4 | 100° C. | No running/no oil leakage | No cracks | No cracks |
| 5 | 90° C. | No running/no oil leakage | No cracks | No cracks |
| 6 | 90° C. | No running/no oil leakage | No cracks | No cracks |
| Comparison Examples |  |  |  |  |
| 7 | 60° C. | Running/ heavy oil leakage | Cracks | Cracks after 2–5 cycles |
| 8 | 50° C. | Running/slight oil leakage | No cracks | Cracks after 3–8 cycles |

We claim:

1. A filling compound having plastic flow behavior for electrical components and light-wave conductors comprising:
   (a) from about 65 to about 90% by weight of a nonpolar, water-immiscible hydrocarbon organic liquid having a pour point below 0° C. and a kinematic viscosity of from about 2 to about 600 cSt measured at about 20° C.; (b) from about 2 to about 25% by weight of an organic polymer selected from the group consisting of a copolymer of ethylene and propylene, a copolymer of ethylene and α-butylene, a copolymer of propylene and α-butylene, and a terpolymer of propylene, α-butylene and ethylene; and (c) from about 2 to about 10% by weight of pyrogenic silica; said filling compound having a dielectric constant at 20° C. of less than about 2.0, a specific breakdown resistance of more than about $10^{10}$ Ohm.cm, a specific gravity of less than about 1.0 g/cm$^3$, a cable filling capacity at room temperature, is free from leakage at a temperature of up to about 90° C., and is free from cracks after 10 freeze-thaw cycles.

2. A filling compound in accordance with claim 1 wherein said organic polymer is soluble in said hydrocarbon organic liquid and is a thickening agent therefor.

3. A filling compound in accordance with claim 2 wherein said pyrogenic silica is dispersed in said organic polymer.

4. A filling compound in accordance with claim 1 including (d) hollow micro-bodies.

5. A filling compound in accordance with claim 4 wherein said micro-bodies have a diameter of from about 5 to about 500 microns.

6. A filling compound in accordance with claim 4 wherein said micro-bodies are present in an amount of from about 0.2 to about 10 percent by weight, based on the weight of said filling compound.

7. A filling compound in accordance with claim 1 wherein said hydrocarbon organic liquid comprises mineral oil having a pour point below 0° C., a density of between about 0.8 and about 0.95 g/l, and a kinematic viscosity of from about 15 to about 300 cSt measured at about 20° C.

8. A filling compound in accordance with claim 1 wherein said organic polymer has a Brookfield melt viscosity of from about 30 to about 70 Pas at 190° C., a softening point of between about 90° C. and about 160° C., and a density of from about 0.83 to about 0.9 g/cc.

9. A filling compound in accordance with claim 1 wherein said silica has a particle size of from about 0.007 to about 0.5 micron, and a powder density of from about 20 to about 120 g/l.

10. A filling compound in accordance with claim 4 wherein said hollow micro-bodies are selected from inorganic materials and organic materials.

11. A filling compound in accordance with claim 10 wherein said micro-bodies comprise glass beads.

12. A filling compound in accordance with claim 10 wherein said micro-bodies comprise gas-filled polymer beads.

13. A filling compound having plastic flow behavior for electrical components and light-wave conductors comprising: (a) from about 65 to about 95 percent by weight of a non-polar, water-immiscible hydrocarbon organic liquid having a pour point below 0° C. and a kinematic viscosity of from about 2 to about 600 cSt measured at about 20° C.; (b) from about 2 to about 25 percent by weight of an organic polymer selected from the group consisting of a copolymer of propylene and α-butylene and a terpolymer of propylene, α-butylene, and a terpolymer of propylene, α-butylene and ethylene; (c) from about 2 to about 10 percent by weight of pyrogenic silica; and (d) from about 0.2 to about 10 percent by weight of hollow micro-bodies, all weights being based on the weight of said filling compound; said filling compound having a dielectric constant at 20° C. of less than about 2.0, a specific breakdown resistance of more than about $10^{10}$ Ohm.cm, a specific gravity of less than about 1.0 g/cm$^3$, a cable filling capacity at room temperature, is free from leakage at a temperature of up to about 90° C., and is free from cracks after 10 freeze-thaw cycles.

14. A filling compound in accordance with claim 13 wherein said hydrocarbon organic liquid comprises mineral oil having a kinematic viscosity of from about 15 to about 300 cSt measured at about 20° C.

15. A filling compound in accordance with claim 13 wherein said organic polymer has a Brookfield melt viscosity of from about 30 to about 70 Pas at 190° C., a softening point of between about 90° C. and about 160° C., and a density of from about 0.83 to about 0.9 g/cc.

* * * * *